United States Patent [19]

Uchida et al.

[11] Patent Number: 4,778,026
[45] Date of Patent: Oct. 18, 1988

[54] PROPELLER SHAFT

[75] Inventors: Yoichi Uchida, Saitama; Akira Sasaki; Hiromasa Tanaka, both of Tokyo, all of Japan

[73] Assignee: Honda Giken Kogyo Kabushiki Kaisha, Tokyo, Japan

[21] Appl. No.: 33,876

[22] Filed: Apr. 2, 1987

Related U.S. Application Data

[63] Continuation of Ser. No. 745,156, Jun. 1, 1985, abandoned.

[30] Foreign Application Priority Data

Jun. 21, 1984 [JP] Japan ................... 59-127756

[51] Int. Cl.$^4$ .............................................. B62D 17/00
[52] U.S. Cl. .................................. 180/297; 180/75.2; 180/73.1; 464/111
[58] Field of Search ............... 180/291, 297, 75, 75.1, 180/75.2, 88, 233, 247, 73.1; 464/111, 115, 140

[56] References Cited

U.S. PATENT DOCUMENTS

| | | | |
|---|---|---|---|
| 2,195,647 | 4/1946 | Guy | 464/111 |
| 2,906,572 | 9/1959 | Wroby | 180/75.2 |
| 3,053,584 | 9/1962 | Dunn | 180/75.2 |
| 3,089,559 | 5/1963 | Rieck | 180/75.2 |
| 3,976,154 | 8/1976 | Clark et al. | 180/24.05 |
| 4,068,499 | 1/1978 | Sharp | 64/8 |
| 4,273,209 | 6/1981 | Orain | 464/111 |
| 4,373,743 | 2/1983 | Parsons, Jr. | 180/73.1 |
| 4,431,079 | 2/1984 | Suzuki | 180/247 |
| 4,476,952 | 10/1984 | Suzuki | 180/247 |

FOREIGN PATENT DOCUMENTS

| | | |
|---|---|---|
| 2721098 | 12/1977 | Fed. Rep. of Germany . |
| 2905453 | 4/1978 | Fed. Rep. of Germany . |
| 3128619 | 4/1982 | Fed. Rep. of Germany . |
| 3201147 | 8/1982 | Fed. Rep. of Germany . |
| 666906 | 11/1965 | France . |
| 2015696A | 9/1979 | United Kingdom . |

OTHER PUBLICATIONS

"Tripod Joints", Glazner Spicer; Jun. 1979 10, rue J. P. Timbaud 78301 Poissy Cedex (France).
ATZ 70 (1968), No. 10, p. 364.
"Kardangelenkgetriebe und ihre Anwendungen", VID-Verlag Dusseldorf, 1973, pp. 21-23 and p. 26.

Primary Examiner—John J. Love
Assistant Examiner—Richard Camby
Attorney, Agent, or Firm—Armstrong, Nikaido, Marmelstein & Kubovcik

[57] ABSTRACT

A propeller shaft in a motor vehicle includes a plurality of shaft members and a plurality of joints operatively coupled between the shaft members, between the engine of the motor vehicle and one of the shaft members, and between a differential coupled to drive wheels and one of the shaft members. At least one of the joints comprises a slidable tripod joint. The tripod joint gives the propeller shaft a desired torque transmission capability and axial sliding displacements, and enables the propeller shaft to have a practically sufficient service life for high-speed rotation.

7 Claims, 3 Drawing Sheets

PROPELLER SHAFT

BACKGROUND OF THE INVENTION

1. Field of the Invention

This application is a continuation of application Ser. No. 745,156 filed June 1, 1985, abandoned.

The present invention relates to a propeller shaft for transmitting the rotation of an engine to drive wheels in an engine-driven vehicle.

2. Description of the Prior Art

There have been employed propeller shafts for transmitting the rotation of an engine to drive wheels in motor vehicles, for example. One known example of a propeller shaft is disclosed in U.S. Pat. No. 3,976,154. The disclosed propeller shaft comprises separate shaft members by which the output shaft of an engine mounted on the front portion of a chassis and the input shaft of a differential on a rear axle are interconnected through joints. The prior propeller shaft has been disadvantageous in that since the spline coupling presents a large frictional resistance in absorbing axial displacements, the propeller shaft fails to be sufficiently effective in absorbing axial displacements and shielding engine vibrations to the chassis, especially where the engine is installed transversely to the vehicle chassis.

SUMMARY OF THE INVENTION

It is an object of the present invention to provide a propeller shaft which will eliminate the drawbacks with the conventional propeller shaft.

Another object of the present invention is to provide a propeller shaft which has an increased torque transmission capability, can provide increased axial sliding displacements, and has an extended service life for high-speed rotation.

According to the present invention, there is provided a propeller shaft in a motor vehicle having a chassis, an engine having an output shaft, drive wheels, and a differential having an input shaft and by which the engine is operatively connected to the drive wheels, said propeller shaft comprising:

(a) a plurality of shaft members operatively interconnected between said output shaft of the engine and said input shaft of the differential; and (b) a plurality of joints operatively coupled between said shaft members, between said output shaft and one of said shaft members, and between said input shaft and one of said shaft members, at least one of said joints comprising a slidable tripod joint.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 2:
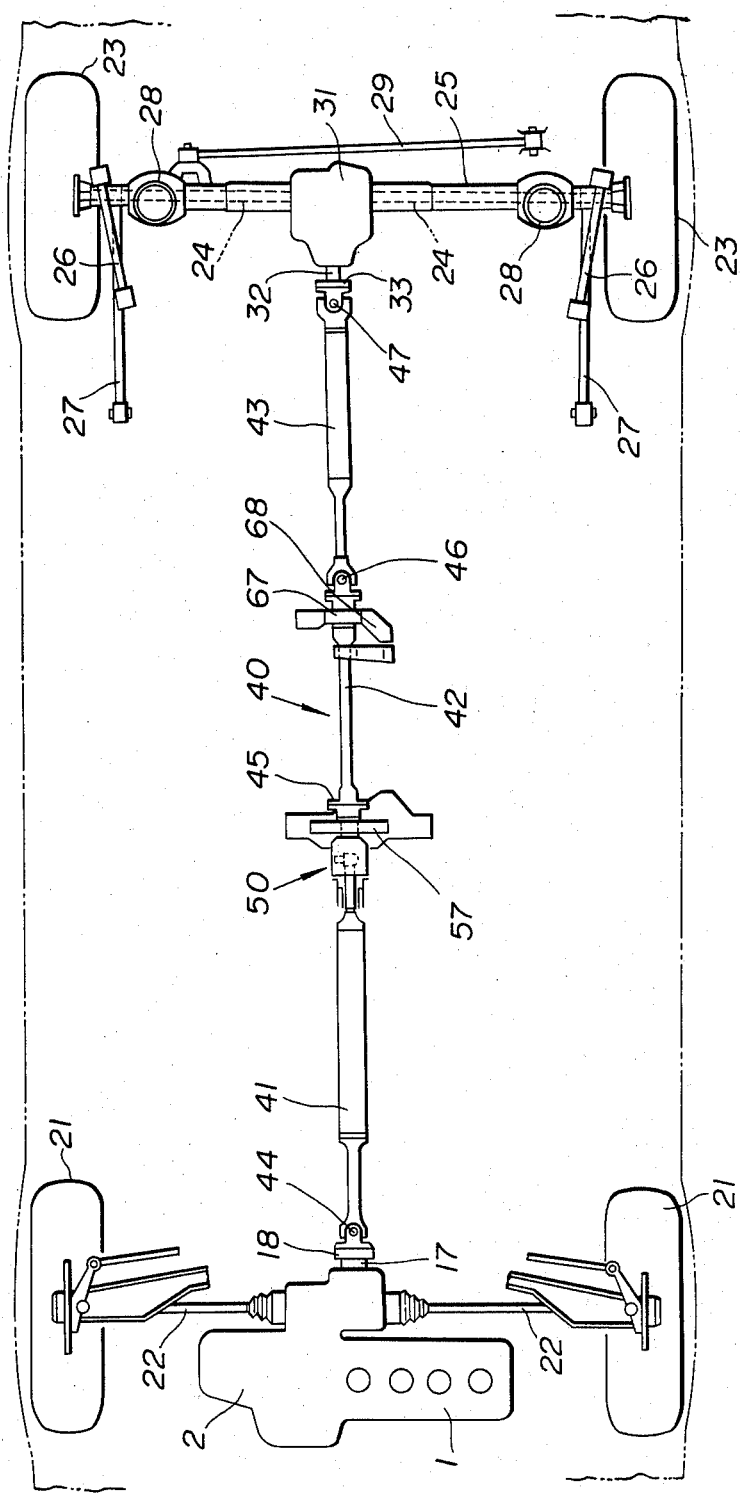
FIG. 2 is a plan view of a driveline incorporating the propeller shaft of the invention in a motor vehicle.
Figure 3:
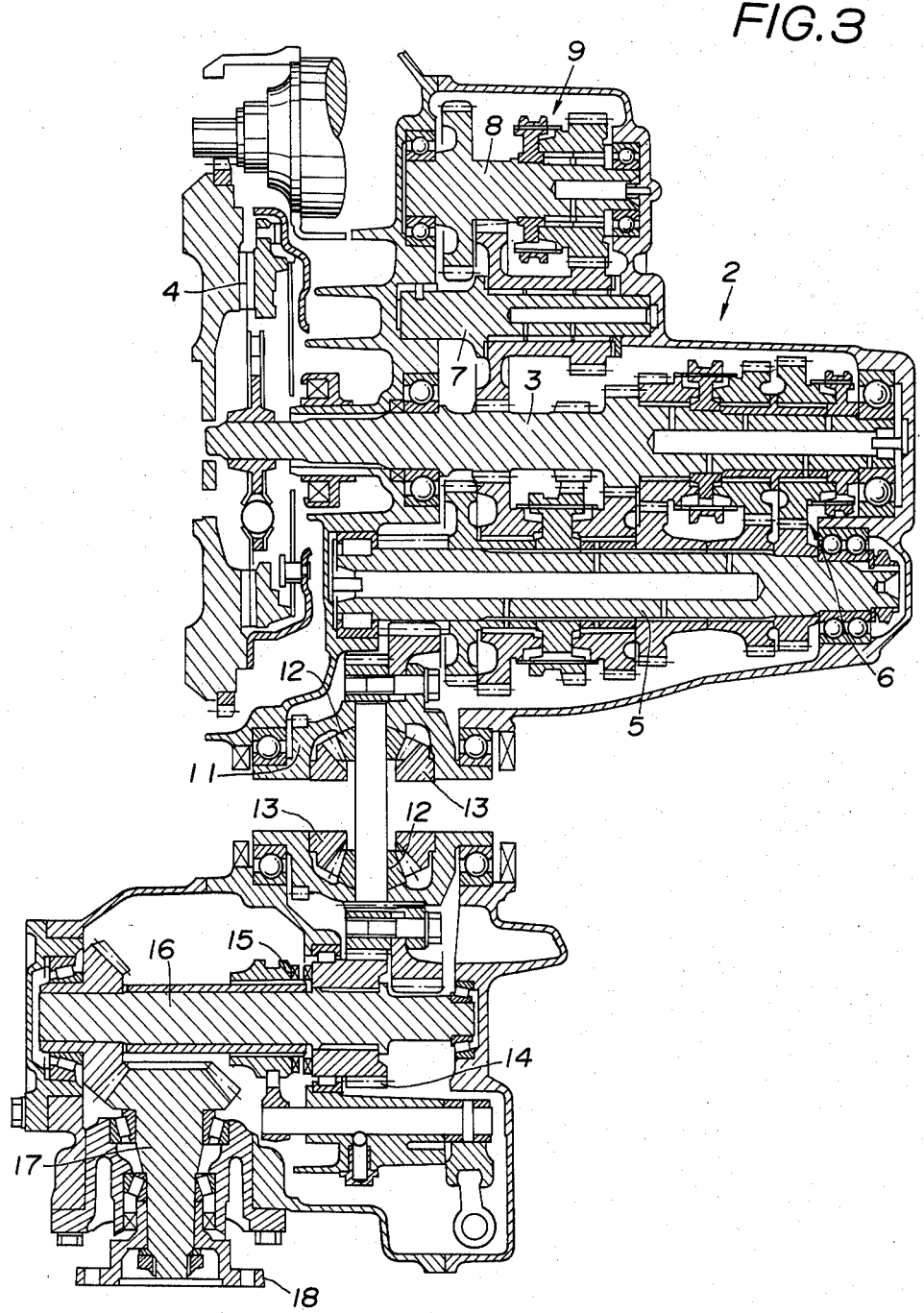
FIG. 3 is a cross-sectional view of a transmission in the motor vehicle.

As shown in FIG. 2, a four-wheel-drive motor vehicle in which the present invention is incorporated has a four-cylinder engine 1 mounted transversely on the front portion of a vehicle chassis. The engine 1 has an integral transmission 2 including an input shaft 3 (FIG. 3) coupled through a clutch 4 to the crankshaft. As illustrated in FIG. 3, the input shaft 3 is operatively coupled to a countershaft 5 through a gear train 6 for five forward gear positions and a reverse gear position and also through a low-speed gear train on two other shafts 7, 9. A differential case 11 is held in mesh with the countershaft 5. Differential side gears 13, 13 held in mesh with differential pinions 12, 12 are coupled to axles 22, 22 (FIG. 2) of front wheels 21, 21 which are supported on independent suspension units as well known in the art.

A speed-reducer pinion 14 is held in mesh with the differential case 11 at a speed-reduction ratio of 0.4. The speed-reducer pinion 14 is operatively coupled through a dog clutch 15 to a speed-reducer shaft 16 with which an output shaft 17 for rear wheels 23, 23 (FIG. 2) is held in mesh in perpendicular relation thereto. The dog clutch 15 is selectively disengaged or engaged to select a front-wheel-drive mode or a four-wheel-drive mode.

As illustrated in FIG. 2, the rear wheels 23, 23 mounted on the rear portion of the vehicle chassis are coupled to axis 24, 24, respectively, which are rotatably supported in a hollow axle housing 25 of a rigid construction. A differential 31 having a speed-reduction ratio of 2.5 is mounted centrally on the axle housing 25. Though the speed-reduction ratio is 2.5 in the embodiment, it may be not more than 3. The axle housing 25 is supported in a live axle manner by a four-link suspension composed of two upper links 26, 26, two lower links 27, 27, each jointed to one end of the axle housing 25, a pair of coil springs 28, 28, dampers (not shown), and a Panhard rod 29.

The output shaft 17 of the transmission 2 has a flange 18 on its rear end. The rear-wheel differential 31 has an input shaft 32 with a flange 33 on its front end. The output and input shafts 17, 32 are operatively interconnected by a three-component propeller shaft 40.

The propeller shaft 40 comprises a first shaft member 41, a second shaft member 42, and a third shaft member 43, successively arranged in order from the output shaft 17. The flange 18 of the output shaft 17 and the first shaft member 41 are operatively coupled to each other by a first joint 44 in the form of a Cardan joint. The first and second shaft members 41, 42 are operatively coupled to each other by a second joint 50 in the form of a slidable tripod joint.

Figure 1:
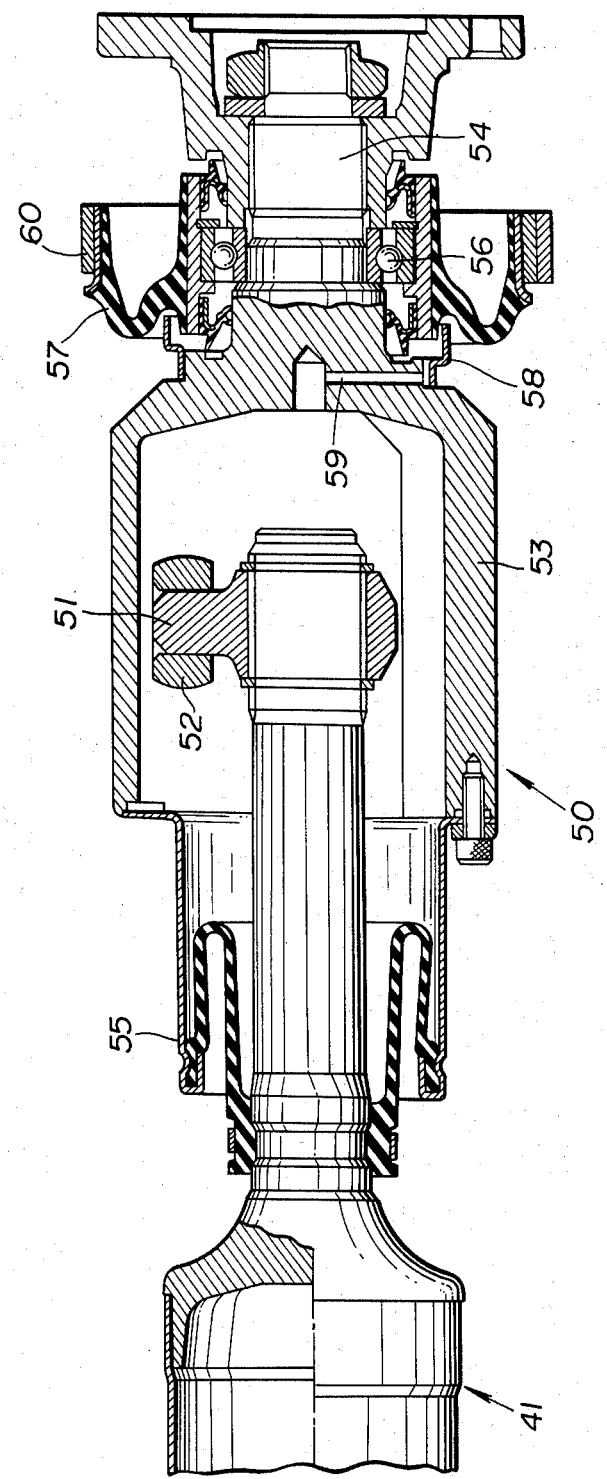
FIG. 1 is a fragmentary longitudinal cross-sectional view of a propeller shaft according to the present invention.

As shown in FIG. 1, the tripod joint 50 is composed of three spider legs 51 (only one shown) mounted on the rear end of the first shaft member 41, rollers 52 rotatably supported on the spider legs 51, respectively, and a tulip 53 having three axial slots in which the rollers 52 on the splider lens 51 are disposed. The tulip 53 is filled with grease, and the open end thereof is sealingly closed by a boot 55 attached to the first shaft member 41.

The tulip 53 has a shaft 54 extending from a rear end thereof. A ring-shaped rubber mount 57 is rotatably mounted on the shaft 54 through a bearing 56. The rubber mount 57 is supported to the body frame through a bracket 60. The shaft 54 is coupled to the second shaft member 42 through flanges 45. The slinger 58 is attached to the tulip 53, and an air hole 59 is defined in the tulip 53.

A ring-shaped rubber mount 67 identical to the rubber mount 57 is mounted through a bearing on the rear end of the second shaft member 42. The rubber mount (67) is supported to the body frame through a bracket (68). The second shaft member 42 and the third shaft member 43 are operatively coupled to each other by a third joint 46 in the form of a Cardan joint. The flange 33 of the differential input shaft 32 and the third shaft member 43 are operatively coupled to each other by a fourth joint 47 comprising a Cardan joint.

Since the slidable tripod joint 50 is used as the second joint in the three-component propeller shaft 40, it allows large axial sliding displacements which are required of the propeller shaft 40 in the motor vehicle with the front transverse engine 1 and the rear live axles 24, 24. The propeller shaft 40 of the illustrated embodiment rotates at a speed which is 2.5 times higher than that of rotation of the rear drive axles 24, 24. The tripod joint 50 permits the propeller shaft 40 to rotate for a practically sufficient service life, and enables the propeller shaft 40 to have a high torque transmission capacity.

With the propeller shaft of the present invention, as described above, one of the joints thereof comprises a slidable tripod joint which gives the propeller shaft a desired torque transmission capability and axial sliding displacements, and which enables the propeller shaft to have a practically sufficient service life for high-speed rotation.

Although a certain preferred embodiment has been shown and described, it should be understood that many changes and modifications may be made therein without departing from the scope of the appended claims.

What is claimed is:

1. A propeller shaft in a motor vehicle having a vehicle body, an engine having an output shaft, drive wheels, and a differential having an input shaft and by which the engine is operatively connected to the drive wheels, said propeller shaft having a first shaft member, a second shaft member and a third shaft member successively arranged in axial order from a front portion of said vehicle to rear portion and operatively interconnected, one to the other, between said input shaft of said differential, and a joint operatively coupled between each of said first, second and third shaft members, between said output shaft and one of said shaft members, and between said input shaft and one of said shaft members, characterized in that one of said joints is a slidable tripod joint with only a single tripod and tulip and said second shaft member is supported on said vehicle adjacent said second shaft's opposite ends by means for allowing axial displacement.

2. A propeller shaft according to claim 1, wherein said engine is mounted on said vehicle body transversely of said motor vehicle.

3. A propeller shaft according to claim 1, wherein said engine is disposed in a front portion of said motor vehicle, said drive wheels comprise rear wheels of said motor vehicle.

4. A propeller shaft according to claim 1, wherein said first shaft member is interconnected at one of its ends to said output shaft of said engine and said slidable tripod joint is interconnected between the other end of said first shaft member and second shaft member.

5. A propeller shaft according to claim 1, wherein said joints except said one joint comprise Cardan joints.

6. A propeller shaft according to claim 5, including a suspension supporting said drive wheels on said vehicle body, said differential being supported by said suspension displaceably with respect to said vehicle body.

7. A propeller shaft according to claim 6, wherein said suspension comprises a four-link suspension.

* * * * *